United States Patent
Dooley (10) Patent No.: US 12,423,111 B1
(45) Date of Patent: Sep. 23, 2025

(54) STATIC INSTRUCTION CACHING IN A COPROCESSOR ARCHITECTURE

(71) Applicant: Tenstorrent USA, Inc., Austin, TX (US)

(72) Inventor: Miles Robert Dooley, Austin, TX (US)

(73) Assignee: Tenstorrent USA, Inc.

(*) Notice: Subject to any disclaimer, the term of this patent is extended or adjusted under 35 U.S.C. 154(b) by 0 days.

(21) Appl. No.: 18/610,302

(22) Filed: Mar. 20, 2024

(51) Int. Cl.
*G06F 9/38* (2018.01)
*G06F 15/78* (2006.01)

(52) U.S. Cl.
CPC .......... *G06F 9/3877* (2013.01); *G06F 9/3808* (2013.01); *G06F 15/7889* (2013.01)

(58) Field of Classification Search
None
See application file for complete search history.

(56) References Cited

U.S. PATENT DOCUMENTS

| | | | |
|---|---|---|---|
| 5,748,979 A * | 5/1998 | Trimberger | G06F 9/3885 712/E9.055 |
| 6,754,804 B1 | 6/2004 | Hudepohl et al. | |
| 7,865,862 B2 * | 1/2011 | Chou | G06F 9/3885 712/214 |
| 9,898,291 B2 | 2/2018 | Henry et al. | |
| 10,599,441 B2 * | 3/2020 | Basher | H04L 9/0643 |
| 2007/0294666 A1 | 12/2007 | Papakipos et al. | |
| 2009/0198978 A1 * | 8/2009 | Greenhalgh | G06F 9/3808 712/226 |
| 2016/0055120 A1 | 2/2016 | Vorbach et al. | |
| 2020/0311022 A1 * | 10/2020 | Ginn | G06F 12/0862 |

FOREIGN PATENT DOCUMENTS

EP 0569987 A1 11/1993

OTHER PUBLICATIONS

International Search Report and Written Opinion dated Jun. 6, 2025 from International Application No. PCT/US25/20669, 11 pages.

* cited by examiner

*Primary Examiner* — Courtney P Spann
(74) *Attorney, Agent, or Firm* — Daylight Law, P.C.

(57) ABSTRACT

Methods and systems relating to improved coprocessing architectures with static instruction caching are disclosed herein. A disclosed coprocessor architecture includes a processor, a coprocessor defined by an instruction set, a cache of static instruction blocks, and an instruction cache. The instruction set includes at least one static instruction. The instruction cache is configured to identify instructions in a series of instructions, provided by the processor for execution by the coprocessor, as either static instructions or dynamic instructions. The instruction cache is configured to, in response to identifying two or more sequential instructions in the series of instructions as static instructions, cache the two or more sequential instructions in the cache of static instruction blocks as an instruction block and store a program counter value of a program counter. The instruction cache is configured to provide the instruction block to the coprocessor from the cache of static instruction blocks when the program counter returns to the program counter value.

20 Claims, 3 Drawing Sheets

STATIC INSTRUCTION CACHING IN A COPROCESSOR ARCHITECTURE

BACKGROUND

Coprocessor architectures play a crucial role in enhancing the computational capabilities of a computer system by offloading specific tasks from the main processor to specialized coprocessors. These coprocessors are designed to efficiently execute particular types of computations, such as floating-point operations or graphics processing. In such architectures, the coordination between the coprocessor and the main processor is vital for seamless operation. Instruction caches, which store frequently used instructions for quick access, serve as a key component in optimizing performance. Effective communication and synchronization mechanisms between the coprocessor and the main processor, along with well-designed instruction caching strategies, are fundamental to achieving optimal performance in coprocessor-based architectures.

Coprocessing architectures allow a main processor to provide instructions to a coprocessor using an instruction cache or instruction buffer located between the main processor and the coprocessor. The instructions identify an operation and the data on which that operation will be executed. The operations are identified by operational codes of the processing architecture. The operational codes are strings of bits that represent a specific operation to be conducted (e.g., operational code "001" tells the functional processing unit to add while "002" tells the functional unit to subtract). A series of instructions with various operational codes can be sent from a processor to a coprocessor for the coprocessor to execute complex operations for the processor. A set of instructions implicated by the set of operational codes that a coprocessor can recognize can be referred to as the instruction set of the coprocessor. Processors and coprocessors can accordingly be defined by their instruction sets.

SUMMARY

Methods and systems related to the field of coprocessor architectures, instructions sets, and instruction caching are disclosed. Methods and systems disclosed herein include an instruction cache which can cache instructions from a processor which are intended for execution by a coprocessor. The methods and systems include identifying specific instructions as static or dynamic instructions. Static instructions are those that are known prior to execution. They are instructions that are not modified during the execution of the program. For example, an instruction which instructed the coprocessor to operate on some data in certain registers or at a certain offset in a memory, where the specified registers or memory offset do not vary from one execution of the program to the next, is a static instruction. Dynamic instructions are those which may be modified during the execution of the program. Such instructions are instructions that have indeterminate execution characteristics at runtime. For example, an instruction which instructed the coprocessor to operate on some data at a certain offset in a memory, where the specified memory offset is part of the instruction, and the part of the instruction itself which specifies the offset is modified during the execution of the program, is a dynamic instruction. In specific alternative embodiments, the disclosure of static instructions throughout this document can instead refer to pass-through instructions which are not modified when being passed through to a coprocessor, while dynamic instructions can, in these alternative embodiments, refer to instructions that do not have such characteristics.

Specific embodiments of the inventions disclosed herein identify instructions in a series of instructions as static instructions and then store the instructions in a cache of static instruction blocks as part of an instruction block. At the same time, a program counter is stored to reflect the point in a program where the series of static instructions was found. Subsequently, when the program counter returns to the stored program counter value, the instructions can be provided to the coprocessor in bulk by transferring them in the block. This approach thereby increases the speed at which a set of static instructions in a program can be executed and reduces power associated with repeatedly transferring the same sequence of instructions from the processor to the coprocessor. The cache of static instruction blocks, the program counter store, and the logic that administrates those circuit blocks and evaluates the instructions can be referred to herein as an instruction cache.

In specific embodiments of the invention, a coprocessor architecture is provided. The architecture comprises a processor, a coprocessor defined by an instruction set, an instruction buffer, and an instruction cache. The instruction set includes static instructions and dynamic instructions. The instruction cache is configured to: identify instructions in a series of instructions, provided by the processor for execution by the coprocessor, as either static instructions or dynamic instructions; in response to identifying two or more sequential instructions in the series of instructions as static instructions, cache the two or more sequential instructions in a cache of static instruction blocks as an instruction block and store a program counter value of a program counter; and provide the instruction block to the coprocessor from the cache of static instruction blocks when the program counter returns to the program counter value. The instruction cache is further configured to update the program counter to the program counter value for the next instruction after the instruction block which thereby allows the processor to bypass all put the first program counter of the static instruction block.

In specific embodiments of the invention, a method is provided. Each step of the method is conducted by an instruction cache. The method comprises identifying instructions in a series of instructions, provided by a processor for execution by a coprocessor, as either static instructions or dynamic instructions. The coprocessor is defined by an instruction set. The instruction set includes static instructions and dynamic instructions. The method also comprises, in response to identifying two or more sequential instructions in the series of instructions as static instructions, caching the two or more sequential instructions in a cache of static instruction blocks as an instruction block and storing a program counter value of a program counter. The method also comprises providing the instruction block from the cache of static instruction blocks to the coprocessor when the program counter returns to the program counter value.

In specific embodiments of the invention, a coprocessor architecture is provided. The coprocessor architecture comprises a processor and a coprocessor defined by an instruction set. The instruction set includes static instructions and dynamic instructions. The coprocessor architecture also comprises a cache of static instruction blocks. The coprocessor architecture also comprises a means for: (i) identifying instructions in a series of instructions, provided by the processor for execution by the coprocessor, as either static instructions or dynamic instructions; (ii) in response to identifying two or more sequential instructions in the series of instructions as static instructions, caching the two or more sequential instructions in the cache of static instruction blocks as an instruction block and storing a program counter value of a program counter; and (iii) providing the instruction block to the coprocessor from the cache of static instruction blocks when the program counter returns to the program counter value.

DETAILED DESCRIPTION

Methods and systems related to the field of coprocessor architectures in accordance with the summary above are disclosed in detail herein. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

Processor architectures involve the design of the various hardware elements required for a processor to conduct computations. A processor can include at least one memory and at least one functional processing unit which are used to conduct the computations of the processor. The computations can be conducted through the execution of instructions by the functional processing units. The memory can include a single hardware element or separate hardware elements. The memory can store both the data on which the computations will be conducted ("operand data") and the instructions themselves ("instruction data" or "instructions"). The processor can be at least partly defined by the instruction set of the processor in that the hardware elements of the processor are designed to operate with that set of instructions. For example, an instruction bus of the processor may be designed to accommodate a data element having the instruction size of the instruction set and the functional processing units of the processor may be designed to take specific actions when a register is loaded with a given operational code from the instruction set.

The processors disclosed herein can take on various forms. The processors can be processing cores in a multicore processor or standalone processors. The processors can be implemented as single chip systems, including wafer-scale single chip systems, multichip single package systems, or in a multichip multipackage system in which the chips are commonly attached to a common substrate such as a printed circuit board (PCB), interposer, or silicon mesh. The processor can be part of a network of processors. The network can be a network on chip (NoC). The processors in accordance with this disclosure can also be part of a network that includes chips on multiple substrates linked together by a higher-level common substrate such as in the case of multiple PCBs each with a set of chips where the multiple PCBs are fixed to a common backplane. Processors in accordance with this disclosure can also be implemented in chiplet based systems. For example, in specific embodiments of the invention, one or more processors could be housed or implemented by one or more networked chiplets, connected, for example, through an interposer.

The processors disclosed herein can include various elements. The processors can include at least one functional processing unit, a memory, and at least one bus. The processors disclosed herein could also include additional or more specific elements such as a network interface unit, controller, serializer/de-serializer, and nonvolatile memory for modifiable configuration information. The functional processing units of the processors can be used to execute component computations required for a computation network to execute a composite computation. The computation network can include routers on each of the processors and a system of buses that either solely connect adjacent processors for facilitating multi-hop communications or also connect distal processors facilitating single-hop communications between those distal processors.

The memory of the processor can take on various forms. The memory could be a random-access volatile memory such as a static random-access memory (SRAM). The memory could store both the instructions that are to be executed by the processor (instruction data) and the data those instructions will use as operands (operand data). The memory could be a cache memory of the processor or a main memory of the processor. The processors could include multiple memories such as a fast cache memory and a main memory. The processors could have a cache instruction memory and a separate cache data memory. In embodiments in which the memory stores compiled instruction data it can be referred to as an instruction memory of the processor.

The functional processing units can take on various forms and be arranged in various ways on the processor. The functional processing units could be implemented in an execution area on the processor. The execution area could be a substantially contiguous region on the substrate of the processor (e.g., a silicon substrate). In specific embodiments of the invention, an execution area is small enough that the time required for the movement of data between any portion of the execution area is negligible relative to the period of the clock of the processor. Specific embodiments of the invention will realize significant benefits which are proportional to the relative cost of fetching instructions from memory and transmitting them to the execution area of a coprocessor. In such embodiments, the benefit of storing instructions in a cache of static instruction blocks, that will be repeatedly executed, will repeatedly save the time and energy associated with fetching the instructions from memory and providing them to a coprocessor regardless of the size of the execution area.

The bus could be an instruction bus for the processor which allows for direct routing of instructions from the instruction memory to the execution area. The functional processing units could be arranged entirely in parallel or in a computation pipeline. If the processors are processing cores, the processing pipeline can be the main computation pipeline of the processing core. The functional processing units can be any kind of computational unit including arithmetic logic units, floating point units, rounding units, general math units, compression units, data type modification units, load units, store units, and other fundamental computation units or computation pipeline units. The processor and coprocessor may have similar functional processing units or different functional processing units directed to different tasks. Load units could be tasked with loading data from a cache memory of the processor, from the main memory of the processor, or from a staging area in the execution area of the processor into the computation pipeline of the processor. Store units could be tasked with storing data output by the functional processing units in a cache memory of the processor or a main memory of the processor. Alternative specialized functional processing units and sets of functional processing units are possible depending upon the application for which the processor or coprocessor is designed. For example, the functional processing units could form a graphics rendering pipeline or a systolic array for dense linear algebra computations.

In embodiments in which the processor includes a controller, such a controller can take on various forms. The processors disclosed herein could include a controller to coordinate the execution of operations within the processor and the exchange of data between the functional processing units and the memory of the processor (including both instruction data and operand data). The controller could handle numerous known actions conducted by standard processor controllers for the administration of the processor as are known in the art. For example, the controller could load instructions from the instruction memory into the execution area of the processor. More specifically, the controller could load the instructions into the instruction decode logic of the execution area of the processor. If the processor is a processing core in a multicore processor, the controller could be a core controller of the processor. In specific embodiments, the controller can be a dedicated Central Processing Unit (CPU) for conducting the administration of the processor.

In specific embodiments of the invention, the processors disclosed herein can be part of a coprocessor architecture having the processor and at least one coprocessor. The processor and coprocessor can be two components on a single core. Alternatively, the processor and coprocessor can be on separate cores on a multicore processor. The processor and coprocessor can also be on the same die or on separate substrates. The processor can be a general-purpose processor such as a central processing unit and the coprocessor can be a specialized processor such as an artificial intelligence accelerator or graphics processing unit. The coprocessor can be a permanent coprocessor or a processor that is temporarily configured to serve as a coprocessor for the processor. The coprocessor can be configured to receive instructions from the processor to execute tasks for the processor.

In specific embodiments of the invention, the coprocessor architectures disclosed herein can include an instruction buffer for accepting instructions from the processor and for then delivering the instructions to the coprocessor. The instruction buffer can be tasked with buffering instructions that are received from the processor for execution by the coprocessor. The instruction buffer can then deliver the instructions to the coprocessor. The coprocessor and processor may share a memory space such that the instructions executed by the coprocessor will update the data in the memory space when they are completed. The instruction buffer can receive instructions from the processor and provide instructions to the coprocessor. The instruction buffer can be integrated with the processor and communicatively coupled to the coprocessor, integrated with the coprocessor and communicatively coupled to the processor, or be a separate system that is communicatively coupled to the processor and the coprocessor. The instruction buffer can receive instructions on a processor instruction bus and deliver instructions to the coprocessor using a coprocessor instruction bus.

The instruction buffer can be a set of registers. The instruction buffer can be a memory. The instruction buffer can be located proximate to the functional processing units of the coprocessor. The instruction buffer can be in the execution engine of the coprocessor. The instruction buffer can be a subblock of and be part of the instruction cache. In embodiments in which the instruction cache is not integrated with the coprocessor, the instruction buffer can be integrated with the instruction cache and can be configured to send its buffered instructions to the execution area of the coprocessor using an instruction bus. The instruction buffer can be part of an instruction decode logic circuit of the processor. The instruction buffer can be separate and distinct from the instruction memory of the coprocessor architecture but can be loaded with instructions from the instruction memory. In specific embodiments, the instruction memory can be implemented in a cache memory of the processor in the form of an SRAM while the instruction buffer is implemented as separate hardware units in the form of registers or latched logic circuits generally.

In specific embodiments of the invention, the instruction cache can be designed to treat static and dynamic instructions differently. The coprocessor can be defined by an instruction set with the instructions of the instruction set capable of being characterized as static instructions and dynamic instructions. The static and dynamic instructions can have the characteristics described in the summary above and can be distinguished in various ways.

In specific embodiments of the invention, the processor can be designed to determine which instructions destined for the coprocessor are static instructions and which instructions are dynamic instructions. This functionality can be implemented in hardware in logic circuits in the instruction cache and the instructions can be evaluated by those logic circuits as they are received. The processor can identify instructions as static or dynamic using several methods such as by using a table that identifies a set of operational codes of the instruction set as being associated with static instructions. The table can be built ex ante with knowledge of the instruction set of the coprocessor and can be stored in read only memory of the instruction cache. The logic circuits of the instruction cache can then evaluate the operational codes of the incoming instructions and see if they match a stored instruction in the table that identifies a static instruction. In embodiments in which the entire instruction set is either static or dynamic instructions, the table only needs to be designed to identify one type of instructions and the identity of the incoming instructions can either be looked up in the table or known through omission (e.g., if it is not in the table it is dynamic, if it is in the table it is static). In alternative approaches, the processor can identify instructions as static or dynamic by monitoring the instruction memory to check for writes to the instruction memory (which would indicate that the instruction is dynamic). Subsequently, the processor could tag the instruction as dynamic and treat it as such in future iterations of the instruction's execution.

The manner in which the instruction cache can treat static instructions and dynamic instructions differently can lead to significant benefits. The static instructions can be executed by the coprocessor and can be stored, in parallel, in a cache of static instruction blocks. The dynamic instructions can be executed by the coprocessor normally. If multiple sequential instructions in a series of instructions are determined to be static instructions, they can be stored as an instruction block for later execution in bulk when the same point in a program or complex computation is reached. This return to the same point in the program can be reached as the program is executed multiple times or as the program takes multiple loops through a specific point of the program. Benefits are realized in that the individual instructions in the block do not need to be moved through the system all the way from the memory of the processor architecture to the coprocessor. Instead, the instructions in the block can be delivered directly from the cache of static instruction blocks in a single clock cycle. Given that the cache of static instruction blocks may be a faster access memory and may be in closer proximity to the execution engine of the coprocessor, the resulting approach can operate faster and with less power consumption as compared to approaches that do not utilize this approach.

Figure 1:
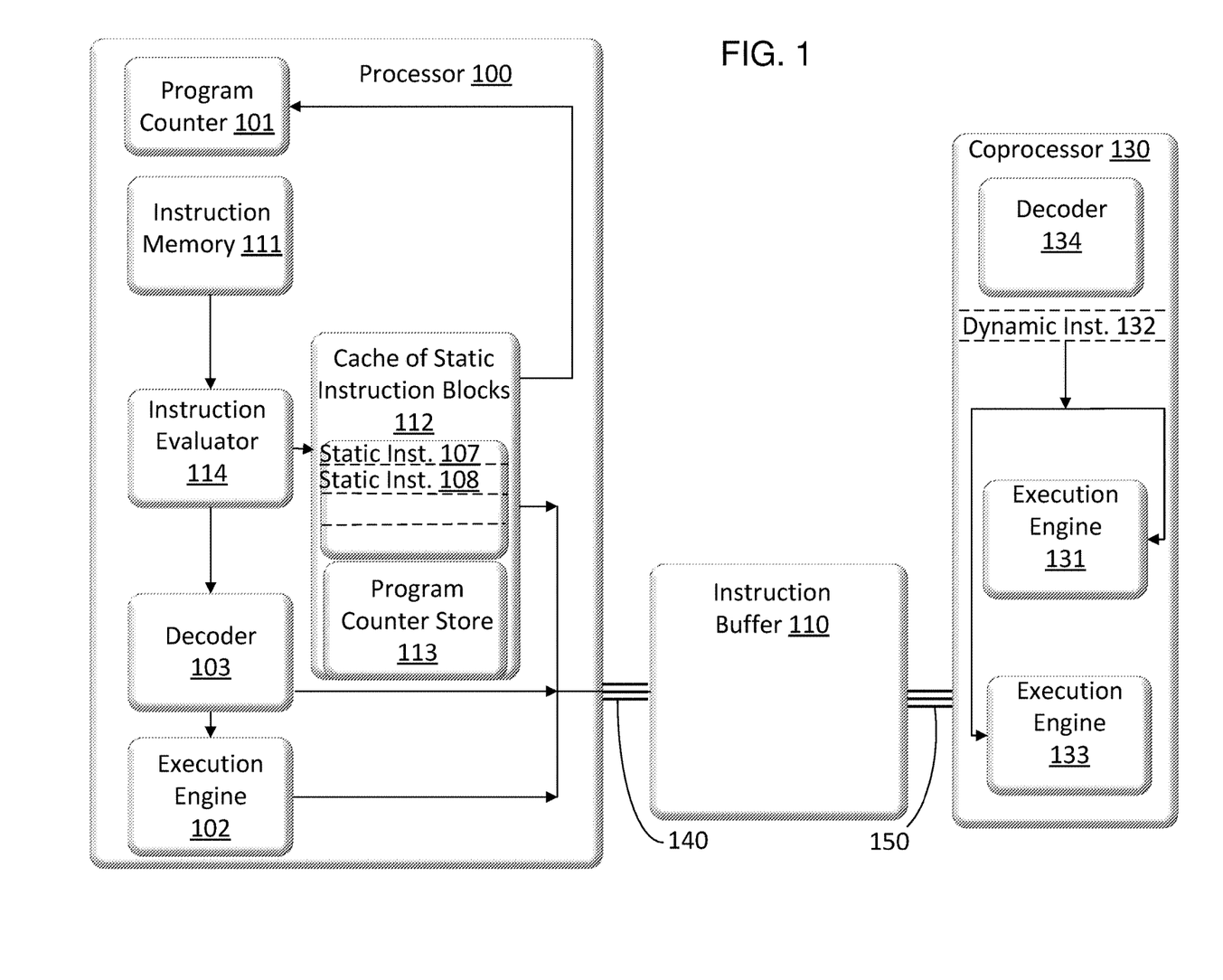
FIG. 1 illustrates a block diagram of a coprocessor architecture in accordance with specific embodiments of the inventions disclosed herein.

FIG. 1 illustrates a block diagram of a coprocessor architecture including processor 100, instruction buffer 110, and coprocessor 130 in accordance with specific embodiments of the invention disclosed herein. The operation of a coprocessor architecture with reference to the disparate treatment of static and dynamic instructions can be described with reference to the block diagram of FIG. 1 and flow chart 200 in FIG. 2. Blocks in flow chart 200 that constitute optional steps are drawn with dotted borders. In FIG. 1, the instruction cache is integrated with processor 100 and includes instruction evaluator 114 and cache of static instruction blocks 112.

The components of the block diagram in FIG. 1 can take on various forms. The coprocessor can be at least partially defined by an instruction set. The instruction set can include all the instructions that can be recognized by the functional processing units of the coprocessor. The instruction set can include all the instructions that can be executed by execution engine 131 and execution engine 133. The processor can insert instructions into the instruction buffer, and the coprocessor can read them from the instruction buffer and decode them for execution by one more execution engines such as execution engine 131 and execution engine 133. The instruction set includes static and dynamic instructions. Processor 100 can include a program counter 101 that is incremented to step through a program and can be set to a new value to branch through the program. The program can be at least partially defined by a series of instructions destined for instruction buffer 110 for execution by coprocessor 130. Processor 100 can include an execution engine 102 for executing computations locally. Instruction buffer 110 can be integrated with coprocessor 130 and be communicatively coupled to processor 100, can be integrated with processor 100 and be communicatively coupled to coprocessor 130, or can be separate from but communicatively coupled to both processor 100 and coprocessor 130.

Figure 2:
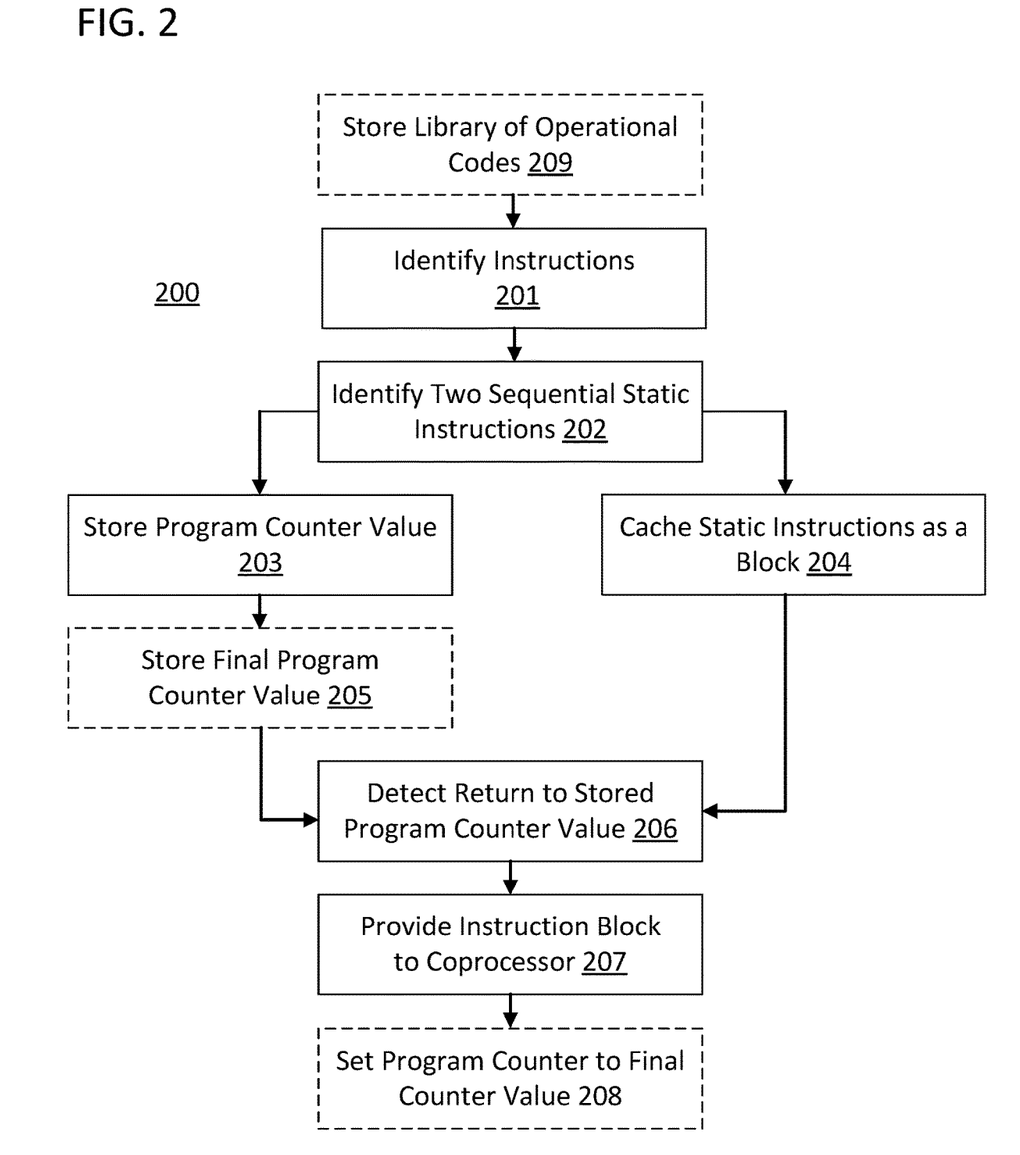
FIG. 2 illustrates a flow chart for a set of methods that are in accordance with specific embodiments of the inventions disclosed herein.

Flow chart 200 includes a step 201 of identifying instructions in a series of instructions, provided by a processor for execution by a coprocessor, as either static instructions or dynamic instructions. The series of instructions can be part of a program or complex computation that is being executed by the coprocessor architecture. For example, the instructions can be part of a series of instructions that processor 100 is instructing coprocessor 130 to execute. The step can be conducted by an instruction evaluator 114 operating on instructions received from an instruction memory 111 on processor 100. The instruction evaluator 114 can be a set of logic circuits and registers including comparators. The instructions that are intended for instruction buffer 110 via instruction bus 140 can first be evaluated by the comparators, or other logic circuits, of instruction evaluator 114 to determine if the instructions are static or dynamic. As will be described below, the comparison can involve evaluating an operational code of the instructions against a library of operational codes that are associated with either static or dynamic instructions. In other approaches, the step can involve monitoring to determine if execution of the instruction involves a write to instruction memory which would indicate that it is a dynamic instruction. Upon identifying an instruction as static or dynamic, the instruction evaluator can throw a flag to assure that cache of static instruction blocks 112 will modify the treatment of the instruction accordingly.

FIG. 1 illustrates how there are three paths from which the coprocessor instructions may arrive at the instruction buffer 110 from the processor 100. As described previously, instruction evaluator 114 may determine that an instruction is intended for a coprocessor and that the instruction is a static instruction. The instruction may then be cached in cache of static instruction blocks, and subsequently provided to instruction buffer 110. This path would route optimized static instructions which are routed in blocks to coprocessor 130. Other instructions may be passed to decoder 103 which can optionally feed an execution engine 102 on processor 100 or steer the instruction to the instruction buffer 110 for eventual execution by coprocessor 130. The path from decoder 103 could route unoptimized static instructions which are not passed in blocks but are otherwise still sent to coprocessor 130. This can be referred to as a pass-through path for instructions. Decoder 103 might be coupled to an execution engine as illustrated or it might be decoupled. Dynamic instructions produced by execution engine 102 may also be sent to instruction buffer 110 for execution on coprocessor 130.

If an instruction is identified as a dynamic instruction, the coprocessor 130 can process the instruction in accordance with standard processing methodologies for coprocessor architectures. The instruction can either be provided directly to instruction decode logic 134 of the coprocessor or it can be buffered on the instruction buffer 110 until the coprocessor is ready to receive an additional instruction. The dynamic instructions can be sent to the coprocessor either from decoder 103 or execution engine 102.

If an instruction is identified as a static instruction, the instruction cache can conduct multiple actions. Firstly, in specific embodiments the cache of static instruction blocks 112 can process the instruction in accordance with standard processing methodologies for coprocessor architectures just as if it were a dynamic instruction. However, to realize later efficiencies, the cache of static instruction blocks 112 can also conduct additional actions in parallel. The cache of static instruction blocks 112 can increment a counter to keep track of how many consecutive instructions in the series of instructions have been static instructions. This counter can be reduced back to zero if a dynamic instruction is identified. The counter can be part of instruction evaluator 114. The cache of static instruction blocks 112 can further store the static instruction. Using multiple iterations of this approach, a series of static instructions can be stored in cache of static instruction blocks 112 as an instruction block where the static instructions in the instruction block are sequential instructions in a series of instructions for execution by coprocessor 130. If the cache of static instruction blocks 112 has only stored a single static instruction before another dynamic instruction is detected, the static instruction can be removed from the instruction buffer. This can be conducted when returning the counter to zero. For example, cache of static instruction blocks 112 can store two consecutive static instructions-static instruction 107 and static instruction 108. However, if static instruction 107 was stored, and the instruction evaluator 114 determined that the next instruction was a dynamic instruction, static instruction 107 could be removed or be marked to be overwritten.

Flow chart 200 includes a step 202 of identifying two sequential static instructions. Referring back to FIG. 1, the two sequential static instructions could be static instruction 107 and static instruction 108. The number of sequential static instructions that are to be identified in this step can change based on the implementation. However, in specific embodiments, benefits can be realized by caching as few as two sequential static instructions. Furthermore, since the overhead for the caching of the instructions is recognized in the form of additional area on the chip to account for the functionality of the instruction cache, and that overhead is independent of the number of instructions cached in a given execution, two sequential static instructions can generally be sufficient for executing the next steps in flow chart 200.

Flow chart 200 continues with a step 204 of caching the two or more sequential static instructions as a block. The step can be conducted in parallel with step 203 of storing a program counter value and so the steps are drawn as branching from step 202. In specific embodiments, step 204 can include caching the most recently identified static instruction in the next available storage location in the cache of static instruction blocks 112. For example, this step can involve cache of static instruction blocks 112 storing static instruction 108 in a subsequent address to static instruction 107. Adjacent static instructions in the series of instructions that are identified as being static instructions can accordingly be stored in adjacent address spaces in the instruction buffer. Step 204 can be conducted in response to identifying two or more sequential instructions in the series of instructions as static instructions and can involve caching the two or more sequential instructions as an instruction block. For the avoidance of doubt, the action that is taken in response to identifying two or more sequential instructions in the series of instructions can be caching the most recently identified instruction in the cache. However, since in these embodiments the previously cached static instructions are already stored, the ultimate result will be caching the two or more sequential instructions in the instruction buffer as a block in response to identifying the two or more sequential instructions as static instructions.

Flow chart 200 also continues with a step 203 of storing a program counter value of a program counter. The program counter can be the program counter of the processor that is providing instructions for a coprocessor in the coprocessor architecture. For example, the program counter can be program counter 101. The program counter can be stored in a program counter store 113 which can be a register, a latch, or any memory element. The program counter value stored in program counter store 113 can be associated with a block of instructions. The program counter value can be stored in association with a block of instructions in cache of static instruction blocks 112. The program counter value can be a value of the program counter that is associated with the first instruction in the block of instructions. For example, the program counter value can be the program counter value associated with the first static instruction in the block of instructions. With reference to FIG. 1, the program counter value can be the program counter value that was associated with static instruction 107 (i.e., the value of the program counter associated with instruction 107 in the series of instructions that processor 100 is executing with the help of the coprocessor architecture). Cache of static instruction blocks 112 can be hardwired to monitor the program counter on processor 100 or the program counter can be delivered with the instructions to the cache of static instruction blocks 112. Regardless of the manner in which the cache of static instruction blocks 112 is provided with access to the program counter, the program counter associated with the first instruction in the instruction block can be stored in response to caching the two or more static instructions in the instruction buffer.

Flow chart 200 continues with a step 206 of detecting a return to the stored program counter value. This step can be conducted after a program which includes the series of instructions has been entirely stepped through or after the program has lopped back to a portion of the program which includes the series of instructions that have been stored in the block of instructions. The cache of static instruction blocks 112 can monitor the program counter of the processor or it can be provided with the program counter of the processor along with the instructions that are provided by the processor. A logic circuit in the cache of static instruction blocks 112 can include a comparator which compares the current program counter value with one or more program counter values that are stored in the program counter store 113. Upon detecting a return to the stored program counter value, the cache of static instruction blocks 112 will know that the next instructions that will be received from processor 100 are the static instructions that are stored in the cache of static instruction blocks 112.

Flow chart 200 continues with a step 207 of providing the instruction block from the cache of static instruction blocks 112 to the coprocessor when the program counter returns to the program counter value. In response to detecting the return to the stored program counter value, as in step 206, a block of instructions associated with that stored program counter value can be provided to the coprocessor for execution. For example, upon detecting a program counter value associated with static instruction 107, the block of instructions consisting of static instruction 107 and static instruction 108 could be provided to coprocessor 130 for execution.

In specific embodiments of the invention, the instruction block can be provided from cache of static instruction blocks 112 to the coprocessor in a single clock cycle of a clock. The clock could be a clock of the processor or a global clock for the coprocessor architecture. Processor 100 can be configured to increment the program counter 101 by one instruction per cycle of the clock. An instruction bus between the instruction buffer and the processor which is coupled to the processor for purposes of buffering instructions from the instruction cache, such as instruction bus 140, could have a width equal to a storage size of the cache of static instruction blocks 112. An instruction bus between the instruction buffer and the coprocessor which is coupled to the coprocessor for purposes of delivering instructions from the instruction cache, such as instruction bus 150, could have a width equal to a storage size of the cache of static instruction blocks 112 or it could be smaller. The reason instruction bus 150 could be smaller would be to save area and to take advantage of the fact that instructions can be buffered temporarily on instruction buffer 110 while still decoupling processor 100 from the work of coprocessor 130 and allowing processor 100 to run ahead. The size of the cache of static instruction blocks 112 could set a maximum allowed size of the instruction block. The maximum allowed size of the instruction block could be set by the size of the cache of static instruction blocks 112. For example, cache of static instruction blocks 112 could be designed to store 256-bytes worth of instructions and instruction bus 150 could be configured with a 256-byte width. However, cache of static instruction blocks 112 could also be designed to store multiple blocks of instructions but limit the size of the instructions. For example, cache of static instruction blocks 112 could be considered to store 512-bytes worth of instructions but could limit the size of each block of instructions to 256-bytes so that each block could be sent in one clock cycle through an instruction bus such as instruction bus 150.

Multiple iterations of the process shown in flow chart 200 can be conducted during the course of the coprocessor executing a complex computation or program. Accordingly, cache of static instruction blocks 112 can end up storing multiple blocks of instructions. The program counter store 113 can thereby also store multiple values of the program counter with each of those multiple values being uniquely associated with a block of instructions in the multiple blocks of instructions. Furthermore, the blocks can be recalled from the instruction buffer and applied to the coprocessor multiple times as the program or computation loops through different branches of the computation or program. Blocks of instructions can also be delivered from the cache of static instruction blocks 112 to the coprocessor 130 during the course of the coprocessor executing a complex computation or program and the cache of static instruction blocks 112 can subsequently add additional blocks of instructions to cache of static instruction blocks 112 during the course of the same complex computation or program.

Specific embodiments of the invention include steps that are in accordance with optional step 205 of flow chart 200 and optional step 208 of flow chart 200. The cache of static instruction blocks can be configured to execute these steps as part of the same logic circuits that are programmed to administrate the program counter store 113 by storing the program counter associated with the first static instruction. Step 205 includes, in response to storing the instruction block in the cache of static instruction blocks in step 204, storing a final program counter value associated with a final instruction in the instruction block. This step can involve monitoring the instruction counter and storing the program counter of the previous instruction stored in program counter store 113 when a dynamic instruction is identified by instruction evaluator 114. The step can alternatively utilize a counter for the number of instructions that have been stored in the cache of static instruction blocks 112 and either storing the counter along with the program counter associated with the first instruction in program counter store 113 so that the counter associated with the final instruction can be derived therefrom, or deriving the counter associated with the final instruction and storing it in the program counter store 113. The final program counter value can be updated each time a new static instruction is added to the instruction buffer so that the currently stored final program counter value is always associated with the last static instruction in cache of static instruction blocks 112. As with the program counter value stored in step 203, the final program counter value stored in step 205 can be one of multiple program counter values stored, such as in program counter store 113, where each of the stored program counter values are uniquely associated with a stored block of instructions in cache of static instruction blocks 112.

Step 208 includes setting the program counter to the final program counter value after providing the instruction block to the coprocessor. This step can include the cache of static instruction blocks sending an interrupt or other signal to processor 100 along with a message to set program counter 101 to a counter value associated with the final instruction. The counter value associated with the final instruction can be the counter value just after the execution of the final instruction in the instruction block. Using this approach, processor 100 can skip down the series of instructions in the program of complex computation it is executing to avoid the power and time inefficiencies associated with sending the instructions in cache of static instruction blocks 112 from processor 100 to instruction buffer 110.

Specific embodiments of the invention include steps that are in accordance with optional step 209 of flow chart 200 and a modified execution of step 201 in flow chart 200. Step 209 includes storing a library of operational codes of the instruction set in a table. The library can identify operational codes as being associated with static instructions. The table can be stored as part of cache of static instruction blocks 112. This table can then be used in step 201 to identify instructions in the series of instructions as either static instructions or dynamic instructions. The step can be conducted using a comparator with access to the operational codes stored in the table and the operational code of an instruction that is provided to the instruction cache. The comparator can be part of instruction evaluator 114. The instructions in the instruction library can be all the static instructions in an instruction set of the coprocessor. In this manner, if an incoming instruction is identified as matching an instruction in the table, the incoming instruction can be identified as a static instruction. In alternative approaches, the instructions in the instruction library can be all the dynamic instructions in an instruction set of the coprocessor and the instruction set can only comprise dynamic and static instructions. In this manner, if an incoming instruction is identified as not matching an instruction in the table, the incoming instruction can be identified as a static instruction. In alternative approaches, instruction evaluation step 201 can be conducted without reference to the operational codes of the instructions or with the operational codes and the other content of the instructions. For example, the instruction itself could be interpreted in terms of what the operands or commands of the instruction are and instructions could be identified based on those contents (e.g., instructions with a variable as an operand would be identified as static). In alternative approaches, instruction evaluation step 201 can involve determining if the execution of an instruction lead to a write to an instruction memory or identifying which instructions are changed in response to a write to an instruction memory. In specific embodiments, the identification process is imperfect in that it will have false negatives where certain static instructions are identified as dynamic instructions. However, so long as there are no false positives, the methods and systems will still provide a benefit in terms of enhancing the efficiency of the coprocessor architecture.

Figure 3:
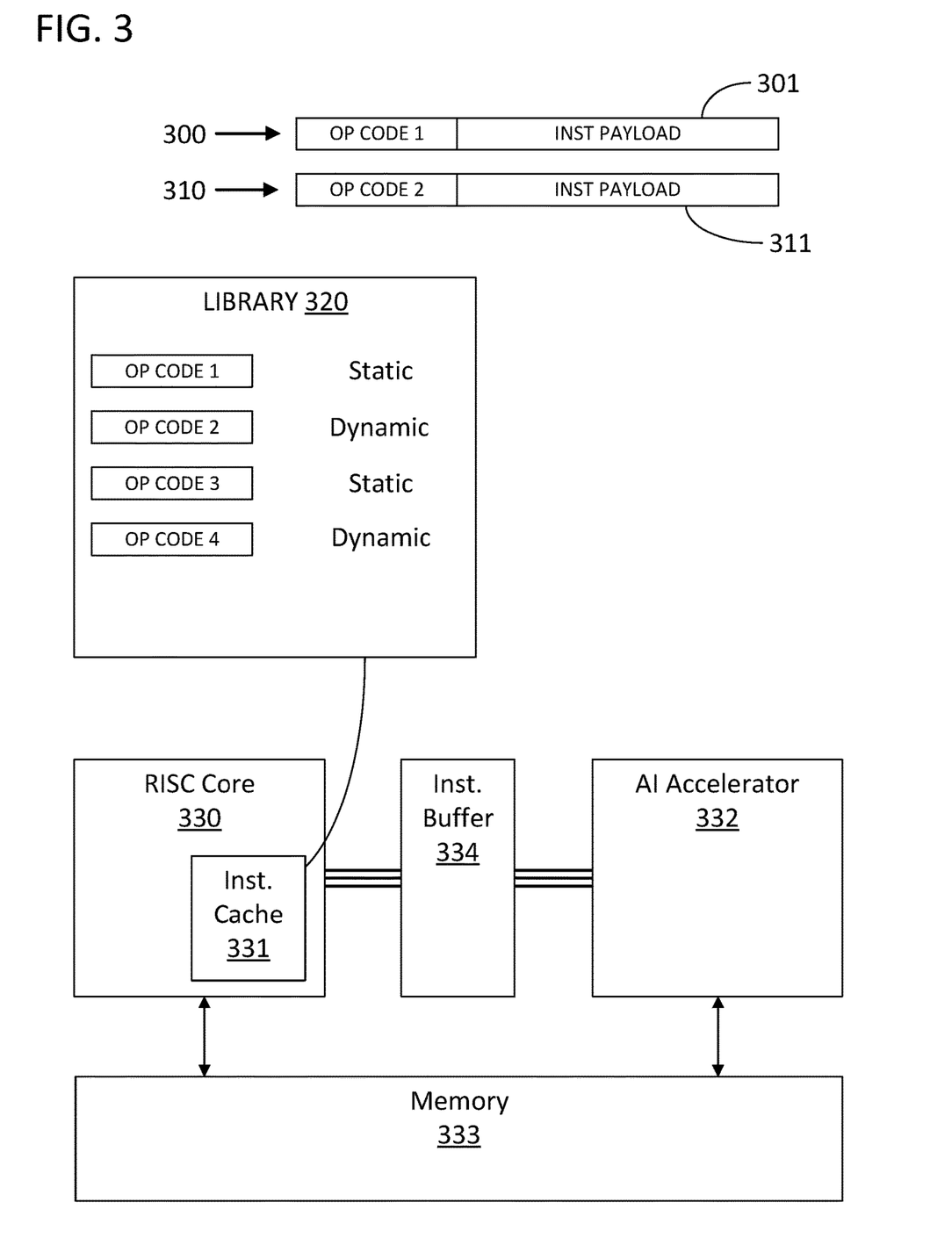
FIG. 3 illustrates a block diagram of a coprocessor architecture having a library of operational codes of an instruction set that defines the coprocessor in accordance with specific embodiments of the inventions disclosed herein.

FIG. 3 illustrates a block diagram of a coprocessor architecture having a library of operational codes of an instruction set that defines the coprocessor in accordance with specific embodiments of the inventions disclosed herein. The figure includes a library 320 having a table that identifies a set of operational codes as being associated with static instructions. Accordingly, when instruction 300 with operational code 1 and instruction payload 301 is received by the instruction buffer it can be identified as a static instruction and when instruction 310 with operational code 2 and instruction payload 311 is received by the instruction buffer it can be identified as a dynamic instruction. As illustrated, library 320 can be stored on a coprocessor architecture on an instruction buffer such as instruction cache 331. The instruction cache 331 can be is configured to identify instructions in the series of instructions, as either static instructions or dynamic instructions, using the table in library 320. In FIG. 3, the coprocessor architecture includes a processor in the form of a RISC core 330 and a coprocessor in the form of an AI accelerator 332. Both the RISC core 330 and AI accelerator 332 can execute instructions in parallel to execute a complex computation using operands stored in memory 333 and resulting in output values that are stored in memory 333. RISC core 330 and AI accelerator 332 are connected via an instruction buffer 334.

Specific embodiments of the invention disclosed herein include a means for: (i) identifying instructions in a series of instructions, provided by the processor for execution by the coprocessor, as either static instructions or dynamic instructions; (ii) in response to identifying two or more sequential instructions in the series of instructions as static instructions, caching the two or more sequential instructions in the instruction buffer as an instruction block and store a program counter value of a program counter; and (iii) providing the instruction block to the coprocessor from the instruction buffer when the program counter returns to the program counter value. Such means can be the instruction caches disclosed herein including cache of static instruction blocks 112 and the associated logic circuits and functional blocks including instruction evaluator 114 and the memory locations such as program counter store 113.

A processor in accordance with this disclosure can include at least one non-transitory computer readable media. The at least one processor could comprise at least one computational node in a network of computational nodes. The media could include cache memories on the processor. The media can also include shared memories that are not associated with a unique computational node. The media could be a shared memory, could be a shared random-access memory, and could be, for example, a DDR DRAM. The shared memory can be accessed by multiple channels. The non-transitory computer readable media can store data required for the execution of any of the methods disclosed herein, the instruction data disclosed herein, and/or the operand data disclosed herein. The computer readable media can also store instructions which, when executed by the system, cause the system to execute the methods disclosed herein. The concept of executing instructions is used herein to describe the operation of a device conducting any logic or data movement operation, even if the "instructions" are specified entirely in hardware (e.g., an AND gate executes an "and" instruction). The term is not meant to impute the ability to be programmable to a device.

A processor in accordance with this disclosure can include at least one logic circuit as described above. The logic circuit can include both active and passive devices and operate with one or more logic levels. The logic circuit can operate using Boolean logic and can be a synchronous clocked circuit or an asynchronous circuit. The logic circuit can include logic gates, flip-flops, latches, registers, and other fundamental circuit components that are required to produce a digitized logical output in response to a digitized logical input. The logic circuit can be implemented directly in hardware such that a logic or operation is conducted by a physical collection of transistors that implement an OR gate and the storage of a data element involves the physical state of at least one flip flop, delay line, or other physical storage element.

While the specification has been described in detail with respect to specific embodiments of the invention, it will be appreciated that those skilled in the art, upon attaining an understanding of the foregoing, may readily conceive of alterations to, variations of, and equivalents to these embodiments. For example, while the instruction cache was described as being part of the processor, in alternative embodiments it could be incorporated as part of the instruction buffer between the coprocessor and processor, or as part of the coprocessor. Any of the methods disclosed herein can be executed by a processor in combination with a computer readable media storing instructions for the methods in combination with the other hardware elements described above. These and other modifications and variations to the present invention may be practiced by those skilled in the art, without departing from the scope of the present invention, which is more particularly set forth in the appended claims.

What is claimed is:

1. A coprocessor architecture comprising:
a processor;
a coprocessor defined by an instruction set, wherein the instruction set includes at least one static instruction;
an instruction buffer; and
an instruction cache configured to: (i) identify instructions in a series of instructions, intended for execution by the coprocessor, as either static instructions or dynamic instructions; (ii) in response to identifying two or more sequential instructions in the series of instructions as static instructions, cache the two or more sequential instructions in a cache of static instruction blocks as an instruction block and store a program counter value of a program counter; and (iii) provide the instruction block to the coprocessor from the cache of static instruction blocks when the program counter returns to the program counter value.

2. The coprocessor architecture of claim 1, further comprising:
a table that identifies a set of operational codes of the instruction set as being associated with static instructions;
wherein the processor is configured to identify instructions in the series of instructions, as either static instructions or dynamic instructions, using the table.

3. The coprocessor architecture of claim 1, wherein:
the instruction cache is configured to: (i) in response to storing the instruction block in the instruction buffer, store a final program counter value associated with a final instruction in the instruction block; and (ii) set the program counter to the final program counter value after providing the instruction block to the coprocessor.

4. The coprocessor architecture of claim 1, wherein:
the instruction block is provided from the cache of static instruction blocks to the coprocessor in a single clock cycle of a clock.

5. The coprocessor architecture of claim 4, wherein:
the processor is configured to increment the program counter by one instruction per cycle of the clock; and
the instruction cache is configured to: (i) in response to storing the instruction block in the instruction buffer, store a final program counter value associated with a final instruction in the instruction block; and (ii) set the program counter to the final program counter value in response to providing the instruction block from the cache of static instruction blocks to the coprocessor.

6. The coprocessor architecture of claim 1, further comprising:
an instruction bus coupled to the processor;
wherein a width of the instruction bus is equal to a maximum allowed size of the instruction block.

7. The coprocessor architecture of claim 1, wherein: the instruction cache is integrated with the processor.

8. The coprocessor architecture of claim 1, wherein:
the static instructions are instructions that are fixed at runtime; and
the dynamic instructions are instructions that have indeterminate execution characteristics at runtime.

9. The coprocessor architecture of claim 1, wherein:
the processor is a general-purpose processor; and
the coprocessor is an artificial intelligence accelerator.

10. A method in which each step is conducted by an instruction cache comprising:
identifying instructions in a series of instructions, provided by a processor for execution by a coprocessor, as either static instructions or dynamic instructions, wherein the coprocessor is defined by an instruction set, and wherein the instruction set includes at least one static instruction;
in response to identifying two or more sequential instructions in the series of instructions as static instructions, caching the two or more sequential instructions in a cache of static instruction blocks as an instruction block and storing a program counter value of a program counter; and
providing the instruction block from the cache of static instructions blocks to the coprocessor when the program counter returns to the program counter value.

11. The method of claim 10, further comprising:
storing a library of operational codes of the instruction set in a table, wherein the library identifies operational codes as being associated with static instructions;
wherein the identifying of instructions in the series of instructions uses the table.

12. The method of claim 10, wherein:
the instruction cache is further configured to: (i) in response to storing the instruction block in the cache of static instruction blocks, store a final program counter value associated with a final instruction in the instruction block; and (ii) set the program counter to the final program counter value after providing the instruction block to the coprocessor.

13. The method of claim 10, wherein:
the instruction block is provided from the cache of static instruction blocks to the coprocessor in a single clock cycle of a clock.

14. The method of claim 13, further comprising:
storing a final program counter value; and
setting the program counter to the final program counter value in response to providing the instruction block to the cache of static instructions blocks;
wherein the processor is configured to increment the program counter by one instruction using the clock.

15. The method of claim 10, further comprising:
storing a final program counter value; and
setting the program counter to the final program counter value in response to providing the instruction block to the cache of static instruction blocks;
wherein the processor is configured to increment the program counter by one instruction using a clock.

16. The method of claim 10, wherein:
the processor is coupled to an instruction bus; and
a width of the instruction bus is equal to a maximum allowed size of the instruction block.

17. The method of claim 10, wherein:
the instruction cache is integrated with the processor.

18. The method of claim 10, wherein:
the static instructions are instructions that are fixed at runtime; and
the dynamic instructions are instructions that have indeterminate execution characteristics at runtime.

19. The method of claim 10, wherein:
the processor is a general-purpose processor; and
the coprocessor is an artificial intelligence accelerator.

20. A coprocessor architecture comprising:
a processor;
a coprocessor defined by an instruction set, wherein the instruction set includes at least one static instruction;
a cache of static instruction blocks; and
a means for: (i) identifying instructions in a series of instructions, provided by the processor for execution by the coprocessor, as either static instructions or dynamic instructions; (ii) in response to identifying two or more sequential instructions in the series of instructions as static instructions, caching the two or more sequential instructions in the cache of static instruction blocks as an instruction block and store a program counter value of a program counter; and (iii) providing the instruction block to the coprocessor from the cache of static instruction blocks when the program counter returns to the program counter value.

* * * * *